No. 750,474. PATENTED JAN. 26, 1904.
C. MONJEAŬ.
WATER PURIFICATION.
APPLICATION FILED DEC. 31, 1901.
NO MODEL.
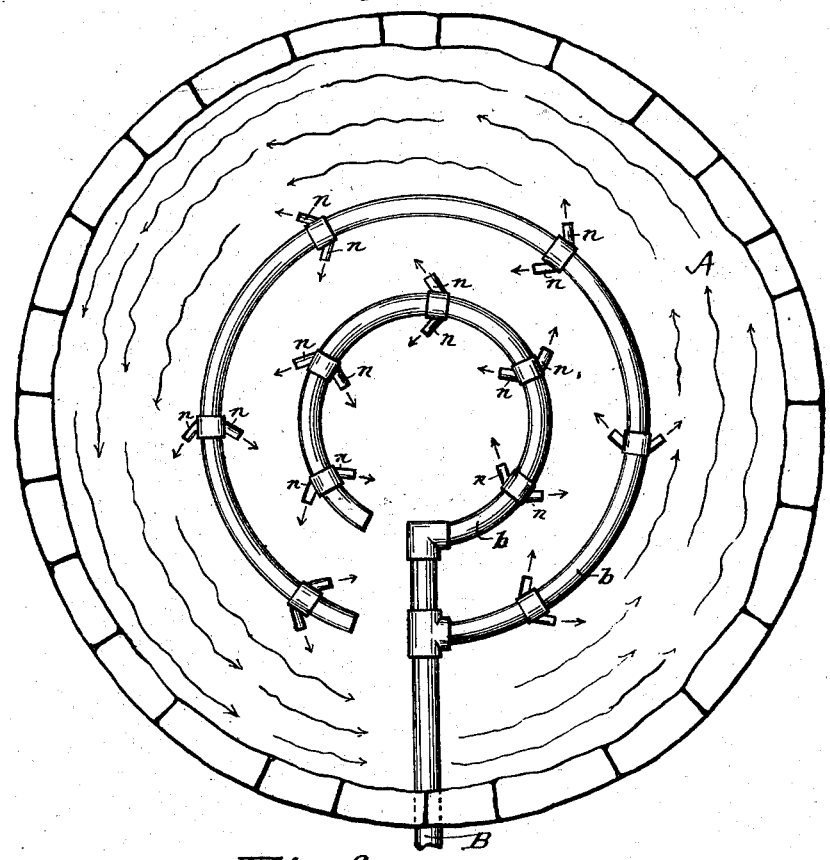
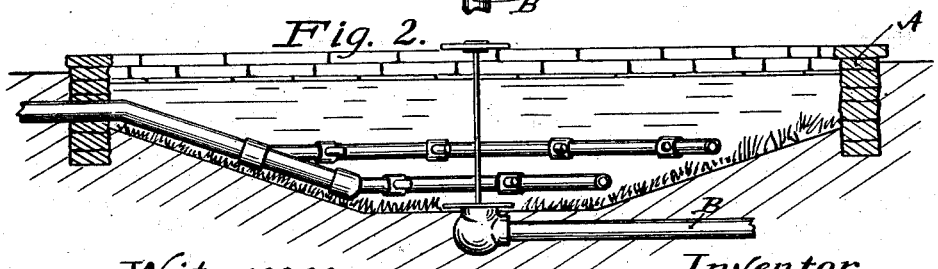

No. 750,474. Patented January 26, 1904.

UNITED STATES PATENT OFFICE.

CLEOPHAS MONJEAU, OF MIDDLETOWN, OHIO.

WATER PURIFICATION.

SPECIFICATION forming part of Letters Patent No. 750,474, dated January 26, 1904.

Application filed December 31, 1901. Serial No. 87,876. (No model.)

*To all whom it may concern:*

Be it known that I, CLEOPHAS MONJEAU, a citizen of the United States, residing at Middletown, in the county of Butler and State of Ohio, have invented new and useful Improvements in Water Purification, of which the following is a specification.

My invention has relation to the treatment of water with a view of purifying and preserving it in a wholesome condition for potable uses, and particularly to the treatment of the "water-supply" of towns, &c., where water is "impounded" or collected and held in open reservoirs for "settling," &c., before being delivered to the distribution-mains. In such reservoirs the water is being constantly drawn off and resupplied, and its quantity thereby varies, but the bulk remains inert and quiescent and under conditions favoring the development of harmful bacteria, fermentation, gases, and bad odors productive of disease. My invention seeks to remedy these conditions by keeping said impounded water in a state of flow while so impounded. By keeping the water in circulating motion the formation of vegetable growths is prevented, and increased aeration is secured by the constantly-changing relations of the water molecules, thereby giving the water a quality of wholesomeness such as a flowing stream in nature possesses. In other words, the deterioration of the water for human uses incident to a prolonged state of quiescence is prevented.

I have heretofore described and patented (Patent No. 681,884, September 3, 1901) a method of water purfication, one feature of which is the passage of water through and among the roots of growing vegetation as a means of utilizing the modifying action of plant life in taking up bacteria inimical to the animal economy.

My present invention may be advantageously used in connection with said or any other process of purification; but it is necessarily confined to such conjoint use.

In carrying out my invention various mechanical appliances may be employed; but under all the circumstances I regard a substantially circular impounding-reservoir with feed-pipes arranged in concentric curves or in a spiral with discharge-nozzles at various points discharging at suitable angles in general direction of the flow desired as the cheapest and best. Air may also be forced into the feed-pipes and be discharged with the water, or water and air may be fed and discharged alternately, both primarily acting to move the body of water, a circulating flow and the air incidentally assisting in the purification. This preferred form of construction and appliance is illustrated in the accompanying drawings, in which—

Figure 1 is a plan view of a circular impounding-reservoir with concentric feed-pipes laid on the bottom, showing the arrangement of the discharge-nozzles; and Fig. 2, a cross-section of the same, showing also how the bottom may be covered by growing vegetation, if desired.

Referring now to the drawings, A designates a reservor of circular form, and B a supply-pipe terminated by circularly-arranged branches $b\ b$, having discharge-nozzles $n$ arranged in the general direction of the desired flow and preferably discharging slightly upward. The action of a considerable number of such discharging streams of water or of water and air commingled near the bottom of the mass of impounded water distributed with regularity is to give a constant circular motion in the direction of the arrows to the mass of water contained in the reservoir A. The reservoir here shown is circular, as best adapted to the end in view; but, as will be obvious, the size and shape of the reservoir is practically immaterial, as the currents will flow as they are driven by the mechanical means employed.

The gentle flow intended, while it will not materially interfere with the settling of the suspended particles of earthy matter contained in the water, gives motion to the entire mass of molecules, and in the general change of position each will become exposed to the air, and thereby oxygenated and purified. Where the general motion is circular, all solid impurities are actuated centrifugally.

The reservoir A may be regarded as one of a series of such reservoirs so arranged that any one may be emptied while the others are in use and its bottom exposed for a time to the sun. Thus the bottom may be sown with grasses and the growth maintained by such occasional exposures to the air and the sun. In such case the water would be benefited by contact with the growing vegetation and the latter nourished by the sedimentary deposits.

Having thus described my invention, what I claim as new, and desire to secure by Letters Patent, is—

1. The process of purifying water impounded in settling or other reservoirs in a system of water-supply, consisting in keeping the impounded water flowing or circulating in contact with the atmosphere and simultaneously increasing aeration by discharging air in small streams therein in the direction of the flow desired.

2. The process of purifying water impounded in settling or other reservoirs in a system of water-supply, consisting in keeping the water so impounded flowing or circulating in contact with the atmosphere by discharging water and air commingled in a plurality of small streams therein, in the direction of the flow desired.

In testimony whereof I have hereunto set my hand in presence of two subscribing witnesses.

CLEOPHAS MONJEAU.

Witnesses:
LLOYD T. BRUNSON,
CHAS. HERBERT JONES.